United States Patent
Phaal et al.

(10) Patent No.: US 8,838,774 B2
(45) Date of Patent: Sep. 16, 2014

(54) METHOD, SYSTEM, AND COMPUTER PROGRAM PRODUCT FOR IDENTIFYING COMMON FACTORS ASSOCIATED WITH NETWORK ACTIVITY WITH REDUCED RESOURCE UTILIZATION

(75) Inventors: Peter Phaal, San Francisco, CA (US); Neil McKee, Oakland, CA (US)

(73) Assignee: InMon Corporation, San Francisco, CA (US)

( * ) Notice: Subject to any disclaimer, the term of this patent is extended or adjusted under 35 U.S.C. 154(b) by 89 days.

(21) Appl. No.: 11/842,850

(22) Filed: Aug. 21, 2007

(65) Prior Publication Data

US 2009/0055420 A1     Feb. 26, 2009

(51) Int. Cl.
*G06F 15/16*     (2006.01)

(52) U.S. Cl.
USPC ............................. 709/224; 709/217; 709/227

(58) Field of Classification Search
USPC ................. 709/201–203, 217–219, 223–229; 707/101–104.1
See application file for complete search history.

(56) References Cited

U.S. PATENT DOCUMENTS

| | | | |
|---|---|---|---|
| 5,646,956 A | 7/1997 | Pinna | |
| 6,134,216 A | 10/2000 | Gehi et al. | |
| 6,473,400 B1 * | 10/2002 | Manning | 370/229 |
| 6,807,156 B1 * | 10/2004 | Veres et al. | 709/232 |
| 6,970,425 B1 | 11/2005 | Bakshi | |
| 8,427,950 B2 | 4/2013 | Phaal et al. | |
| 2002/0080808 A1 * | 6/2002 | Leung | 370/412 |
| 2002/0170071 A1 * | 11/2002 | Parnell et al. | 725/130 |
| 2003/0086422 A1 * | 5/2003 | Klinker et al. | 370/389 |
| 2003/0099208 A1 * | 5/2003 | Graziano et al. | 370/286 |
| 2003/0110007 A1 * | 6/2003 | McGee et al. | 702/179 |
| 2004/0003286 A1 | 1/2004 | Kaler et al. | |
| 2005/0007975 A1 * | 1/2005 | Shen et al. | 370/320 |
| 2005/0111367 A1 | 5/2005 | Chao et al. | |
| 2005/0120013 A1 * | 6/2005 | Chang et al. | 707/4 |
| 2005/0120019 A1 | 6/2005 | Rigoutsos et al. | |
| 2005/0195834 A1 | 9/2005 | Kikuchi | |
| 2006/0075491 A1 * | 4/2006 | Lyon | 726/22 |
| 2006/0098585 A1 | 5/2006 | Singh et al. | |
| 2006/0265489 A1 * | 11/2006 | Moore | 709/223 |
| 2007/0061266 A1 * | 3/2007 | Moore et al. | 705/51 |

(Continued)

OTHER PUBLICATIONS

Non-Final Office Action for U.S. Appl. No. 11/846,357, mailed on Aug. 10, 2009, 13 pages.

(Continued)

*Primary Examiner* — Jenee Williams
(74) *Attorney, Agent, or Firm* — Kilpatrick Townsend & Stockton LLP

(57) ABSTRACT

Disclosed are a method, system, and computer program product for determining a common factor contributing to network activity with reduced computational resource utilization. In some embodiments of the present invention, the method or the system determines one or more factors by examining one or more information transmitted across the network. The method or the system stores a number of information attributable to each of the factors and determines whether the number exceeds a threshold requirement. Where the number for a factor exceeds the threshold requirement, the method or the system then determines a summary statistic for the number of information. Thereafter, the method or the System updates the data structure corresponding to the factor being analyzed based upon the summary statistic. Once the data structure is updated based upon the summary statistic, the method or the system determine one or more common factors for the network activities.

17 Claims, 17 Drawing Sheets

(56) References Cited

U.S. PATENT DOCUMENTS

2007/0061393 A1* 3/2007 Moore .................. 709/201
2007/0106754 A1* 5/2007 Moore .................. 709/217
2007/0180096 A1 8/2007 Roth et al.
2009/0059796 A1 3/2009 Phaal et al.
2009/0137267 A1* 5/2009 Nader et al. ............ 455/552.1

OTHER PUBLICATIONS

Non-Final Office Action for U.S. Appl. No. 11/846,357, mailed on Apr. 13, 2010, 17 pages.
Final Office Action for U.S. Appl. No. 11/846,357, mailed on Sep. 16, 2010, 19 pages.
Non-Final Office Action for U.S. Appl. No. 11/846,357, mailed on Mar. 29, 2011.
Final Office Action for U.S. Appl. No. 11/846,357, mailed on Dec. 20, 2011, 15 pages.
Non-Final Office Action for U.S. Appl. No. 11/846,357 mailed on Aug. 1, 2012, 17 pages.
Interview Summary for U.S. Appl. No. 11/846,357 mailed on Nov. 21, 2012, 3 pages.
Notice of Allowance for U.S. Appl. No. 11/846,357 mailed on Dec. 26, 2012, 8 pages.

* cited by examiner many containment hierarchies remain possible, based on information such as geographic locations, network subnets etc.

```
long sumRows;
double sumFrames;
double sumBytes;

private static boolean[][] perm =
{
    { true, false, false, false, false, false, false, false},
    { true, true, false, false, false, false, false, false},
    { true, true, true, false, false, false, false, false},
    { true, true, true, true, false, false, false, false},
    {false, false, false, true, false, false, false, false}, {false, false, false, false, true, false, false, false},
    {false, false, false, false, true, true, false, false},
    {false, false, false, false, true, true, true, false},
    {false, false, false, false, true, true, true, true},
    {false, false, false, false, false, false, false, true}, { true, false, false, false, true, false, false, false},
    { true, false, false, false, true, true, false, false},
    { true, false, false, false, true, true, true, false},
    { true, false, false, false, true, true, true, true},
```

FIG 7A

{ true, false, false, false, false, false, false, true },

{ true, true, false, false, true, false, false, false },
{ true, true, false, false, true, true, false, false },
{ true, true, false, false, true, true, true, false },
{ true, true, false, false, true, true, true, true },
{ true, true, false, false, false, false, false, true }, { true, true, true, false, true, false, false, false },
{ true, true, true, false, true, true, false, false },
{ true, true, true, false, true, true, true, false },
{ true, true, true, false, true, true, true, true },
{ true, true, true, false, false, false, false, true }, { true, true, true, true, true, false, false, false },
{ true, true, true, true, true, true, false, false },
{ true, true, true, true, true, true, true, false },
{ true, true, true, true, true, true, true, true },
{ true, true, true, true, false, false, false, true }, {false, false, false, true, true, false, false, false},
{false, false, false, true, true, true, false, false},
{false, false, false, true, true, true, true, false},
{false, false, false, true, true, true, true, true}.

FIG 7B

{false, false, false, true, false, false, false, true}.

};

```
private String permKey(boolean[] mask, ArrayList row) {
    StringWriter sw = new StringWriter();
    for(int i = 0; i < mask.length; i++) {
        if(i > 0) sw.append(',');
        if(mask[i]) {
            String val = (String)row.get(i);
            if(val != null) sw.append(val);
        }
    }
    return sw.toString();
} class MyAccumulator{
    long nrows = 0l;
    double nframes = 0.0d;
    double nbytes = 0.0d;
} private void prune(HashMap factors) {
    Iterator iter = factors.values().iterator();
```

FIG 7C

```
long[] nrows = new long[PRUNESMPL];

double[] nframes = new double[PRUNESMPL];

double[] nbytes = new double[PRUNESMPL];

for(int i = 0; i < PRUNESMPL; i++) {

MyAccumulator a = (MyAccumulator)iter.next();

nrows[i] = a.nrows;

nframes[i] = a.nframes;

nbytes[i] = a.nbytes;

}

Arrays.sort(nrows);

Arrays.sort(nframes);

Arrays.sort(nbytes);

int mid = PRUNESMPL / 2;

long median_nrows = nrows[mid];

double median_nframes = nframes[mid];

double median_nbytes = nbytes[mid];

iter = factors.values().iterator();

while(iter.hasNext()) {

MyAccumulator a = (MyAccumulator)iter.next();

if(a.nrows <= median_nrows
```

FIG 7D

```
            && a.nframes <= median_nframes
            && a.nbytes <= median_nbytes) iter.remove();
      }
   } private ArrayList truncate(HashMap<String,MyAccumulator> factors,
double cutoff) {

ArrayList<Factor> list = new ArrayList();
      for(Map.Entry<String,MyAccumulator> entry : factors.entrySet()) {
         String key = entry.getKey();
         MyAccumulator a = entry.getValue();
         double p_rows = (double)(a.nrows) / (double)sumRows;
         double p_frames = a.nframes / sumFrames;
         double p_bytes = a.nbytes / sumBytes;
         if(p_rows >= cutoff || p_frames >= cutoff || p_bytes >= cutoff) {
            ArrayList<String> keys = ConfigUtils.extractTokens(key,'.');
            Factor factor = new Factor(keys,a,p_rows,p_frames,p_bytes);
            list.add(factor);
         }
      }
      return list;
   }
```

FIG 7E

```java
public void tableRow(ItsTable table, ArrayList row, Object magic) {
    double frames = Double.parseDouble((String)row.get(8));
    double bytes = Double.parseDouble((String)row.get(9));
    long count = Long.parseLong((String)row.get(10));

HashMap<String,MyAccumulator> factors =
        (HashMap<String,MyAccumulator>)magic;

// update global counts
    sumRows++;
    sumFrames += frames;
    sumBytes += bytes;

for(int p = 0; p < perm.length; p++) {
        String key = permKey(perm[p],row);
        MyAccumulator a = factors.get(key);
        if(a == null) {
            a = new MyAccumulator();
            factors.put(key,a);
        }
        a.nrows++;
        a.nframes += frames;
        a.nbytes += bytes;
    }
}
```

FIG 7F

```
        if(factors.size() > PRUNESIZE) prune(factors);
    } class Factor {

ArrayList<String> key;

MyAccumulator accum;

double p_rows;

double p_frames;

double p_bytes;

public Factor(ArrayList key, MyAccumulator accum, double p_rows,
    double p_frames, double p_bytes) { this.key = key;

this.accum = accum;

this.p_rows = p_rows;

this.p_frames = p_frames;

this.p_bytes = p_bytes;
    }
    public int nKeys() {
        int count = 0;
        for(int i = 0; i < key.size(); i++) {
            if(key.get(i).length() > 0) count++;
        }
```

FIG 7G

```
    return count;
} public boolean hasChild(Factor child) {
    for(int i = 0; i < key.size(); i++) {
        if(key.get(i).length() > 0 && !key.get(i).equals(child.key.get(i))) return false;
    }
    return true;
} public boolean closeTo(Factor child, double dist) {
    return Math.abs(p_rows - child.p_rows) <= dist
            && Math.abs(p_frames - child.p_frames) <= dist
            && Math.abs(p_bytes - child.p_bytes) <= dist;
} public double maxP() {
    return Math.max(Math.max(p_frames,p_bytes),p_rows);
} private HashMap clusterByNKeys(ArrayList<Factor> list) {
    HashMap<Integer,ArrayList> clusters = new HashMap();
    for(int i = 0; i < list.size(); i++) {
```

FIG 7H

```
        int nkeys = list.get(i).nKeys();

ArrayList<Factor> cluster = clusters.get(nkeys);

if(cluster == null) { cluster = new ArrayList();

clusters.put(nkeys,cluster);

} cluster.add(list.get(i));

} return clusters;

} private ArrayList compress(ArrayList<Factor> list,double cutoff) {

HashMap<Integer,ArrayList> clusters = clusterByNKeys(list);

ArrayList compressed = new ArrayList();

for(int i = 8; i >= 1; i--) {

ArrayList<Factor> cluster = clusters.get(i);

if(cluster != null) { for(int j = 0; j < cluster.size(); j++) {

Factor factor = cluster.get(j);

for(int k = i - 1; k >= 1; k--) {

ArrayList<Factor> parents = clusters.get(k);

if(parents != null) {

Iterator<Factor> iter = parents.iterator();

while(iter.hasNext()) {
```

FIG 7I

```
            Factor parent = iter.next();
                if(parent.hasChild(factor)                    &&
parent.closeTo(factor,cutoff)) iter.remove();
                }
              }
            }
            compressed.add(factor);
        }
      }
    }
    return compressed;
} private ArrayList<Factor> result;

public void calculateFactors(double cutoff) throws ItsException {
    ItsQuery query = ItsQuery.queryForView();
    query.setResultField("sourcezone,sourcegroup,sourceaddress,source
port,destinationzone,destinationgroup,destinationaddress,destinationport,fra
mes,bytes");

HashMap<String,MyAccumulator>        factors      =      new
HashMap(PRUNESIZE);
    sumRows = 0l;
```

FIG 7J

```
sumFrames = 0.0d;

sumBytes = 0.0d;

query.getDataStreamed(this,factors);

ArrayList list = truncate(factors,cutoff);

result = compress(list,cutoff);

METHOD, SYSTEM, AND COMPUTER PROGRAM PRODUCT FOR IDENTIFYING COMMON FACTORS ASSOCIATED WITH NETWORK ACTIVITY WITH REDUCED RESOURCE UTILIZATION

CROSS REFERENCED AND RELATED APPLICATIONS

This application is related to commonly assigned U.S. patent application Ser. No. 11/846,357, which is entitled "METHOD, SYSTEM, AND COMPUTER PROGRAM PRODUCT FOR IDENTIFYING COMMON FACTORS ASSOCIATED WITH NETWORK THRESHOLD VIOLATIONS" filed on Aug. 28, 2007, now U.S. Pat. No. 8,427,950, the content of which is incorporated herein by reference in its entirely.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files and records, but otherwise reserves all other copyright rights.

BACKGROUND AND SUMMARY

Various embodiments of the present invention relates to methods and apparatus for determining one or more common factors or one or more causes which explain one or more threshold notifications in a data communications network.

Network traffic monitoring is a vital part of network management. A network typically comprises two or more devices which are connected together using some form of communication medium. For example, in a computer network, two or more processing nodes may be connected to, either wirelessly or by wire(s), one or more network devices such as routers or switches which are in turn connected to other network devices. These devices and nodes may also be connected to some non-processing devices such as network printers, facsimile machines, or other resources to share these devices and resources. As another example, a telecommunication network may comprise two or more telecommunications links and nodes such that one or more messages may be transmitted from one part of the telecommunication network to another through one or more links and nodes. In fact, in a typical network, whether computer network, telecommunications network, or other types of network, most activities would produce some network traffic.

On the other hand, a network constitutes a resource which is shared among the nodes. Such resources normally have certain bandwidth limitations on the amount of information that may be transmitted at any given instant in time. That is, the more network resource that one or more nodes on a network utilize at a given instant in time or during a period of time, the less amount of such a shared network resource will be available for the other nodes on the same network at the same instant or during the same period in time. In other words, these other nodes on the same network may be adversely affected if the network is overloaded with existing network traffic.

As a result, monitoring network traffic provides important information for the smooth operation of a network. Monitoring network traffic may also be essential for operating cost allocation, network capacity planning, fault detection and isolation, security management, or service quality analysis.

A common practice for monitoring network traffic is to maintain one or more counters which relate to the amount of information being transmitted across the entire network. More particularly, the network may employ methods or apparatus to measure the amount of activities on each link, through each node or device, or across the entire network. For example, the methods or apparatus may periodically sample the one or more counters and determine the differences or changes in each of the one or more counters. Such differences or changes in each of the one or more counters may be configured or defined to indicate the amount of network traffic during the sampling period. A typical sampling process may be a time-based sampling process, which has been proven to be less accurate than packet-based sampling. After the sampling process, some current approaches may proceed further to determine one or more thresholds for each of the one or more counters. These thresholds define the levels of network traffic beyond which may cause performance issues or other negative impacts. These approaches may then generate a notification once it is determined that certain thresholds have been exceeded.

In the past, a large number of nodes may be connected to a network with shared resources. In this type of network, a single device connected to the network may be sufficient to monitor all the traffic. Nowadays, this may not be the case as networking has become more complicated. For example, a computer network may contain several network segments, each of which constitutes a portion of the network wherein every device communicates using the same physical layer. In such a computer network, nodes or devices operating at layer two (the data link layer) or higher layers create new physical layers and create other network segments. In such a network, responding to threshold notifications may be quite challenging.

Network management systems or administrators often identify the causes or factors which contribute to network activities. For example, the network management system may identify the causes or factors contributing to network activities by using numerous ways to obtain information about packets transmitted in the computer network. Commonly, a network probe may be attached to the computer network and monitor packets transmitted across the computer network. Alternatively, network elements such as, but not limited to, wireless access points, switches, routers, and hosts may be used to monitor packets transmitted through these network elements and to report on the traffic with technologies such as sFlow, Netflow, IPFIX, or RMON.

For example, in order to identify a cause of such a threshold notification which often corresponds to a network violation, it may be required to examine the communications or transmitted information which traverses the adversely affected network resources. In a modern computer network containing multiple network devices, the network may generate simultaneous threshold notifications. Although some of the threshold notifications may be initiated by causes totally independent from or irrelevant to each other some other threshold notifications may nonetheless be related and thus make the identification of a cause of a threshold notification even more difficult.

Currently, identifying and analyzing the causes of the threshold notifications often requires a manual analysis of the traffic through each of the nodes or device along the communication path which leads to the generation of threshold notifications. Such an approach not only relies heavily on the experience and expertise of network administrators or whoever is responsible for monitoring the network traffic but also runs the inherent risk of inaccurately identifying or misidentifying the causes of such threshold notifications.

The disclosure in the U.S. patent application Ser. No. 11/846,357 which is entitled "METHOD, SYSTEM, AND COMPUTER PROGRAM PRODUCT FOR IDENTIFYING COMMON FACTORS ASSOCIATED WITH NETWORK THRESHOLD VIOLATIONS" provides various methods and an apparatus to efficiently identify the causes or factors of excessive network activities such that prompt control actions may be taken to mitigate the adverse effects on network performance. The aforementioned cross-related Application further provides periodic updates of counters and information on the information being transmitted across the entire network to aid the identification of factors or causes for such threshold notifications.

Nonetheless, determining common factors in a typical network may require large amounts of computation resources such as memory or processing time. Often, there may be millions or more packets with many different combinations of factors transmitted in a moderately sized computer network at a given instant in time. Creating and handling records for all the combinations of factors present in the network traffic so as to calculate each factor's relative importance of the factor's contribution to the network traffic is often impractical or even prohibitive.

U.S. Pat. No. 5,646,956 issued to Pinna (hereinafter Pinna) discloses a method for calculating the top contributors to a single factor. Nonetheless, Pinna becomes less effective as the number of network activity entries in the table becomes larger since Pinna's method traverses the long list of entries with each table update. As such there exist a need for a more effective method and apparatus to determine common factors contributing to network activities.

As such, it is an objective of various embodiments of the present invention to provide a method and an apparatus to determine one or more common factors with reduced utilization of computational resources.

BRIEF DESCRIPTION OF THE FIGURES

The accompanying drawings are included to provide a further understanding of the invention and, together with the Detailed Description, serve to explain the principles of the invention.

FIGS. 7A through 7K demonstrate an algorithm in accordance with an exemplary embodiment of the present invention.

DETAILED DESCRIPTION

Various embodiments of the present invention are generally directed to a method, system, and computer program product for determining a common factor contributing to network activity with reduced computational resource utilization. In some embodiments of the present invention, the method or the system determines one or more factors by examining one or more information transmitted across the network. The method or the system then stores a number of information attributable to each of the factors and determines whether the number exceeds a threshold requirement. If the number for a factor is determined to exceed the threshold requirement, the method or the system then determines a summary statistic for the number of information. Thereafter, the method or the system updates the data structure corresponding to the factor being analyzed based upon the summary statistic. Once the data structure is updated based upon the summary statistic, the method or the system determine one or more common factors for the network activities. More details regarding the determination the one or more common factors for the network activities are disclosed in the pending cross-related application entitled "METHOD, SYSTEM, AND COMPUTER PROGRAM PRODUCT FOR IDENTIFYING COMMON FACTORS ASSOCIATED WITH NETWORK THRESHOLD VIOLATIONS" under application Ser. No. 11/846,357, which is incorporated by reference in its entirety in this application.

Figure 1:
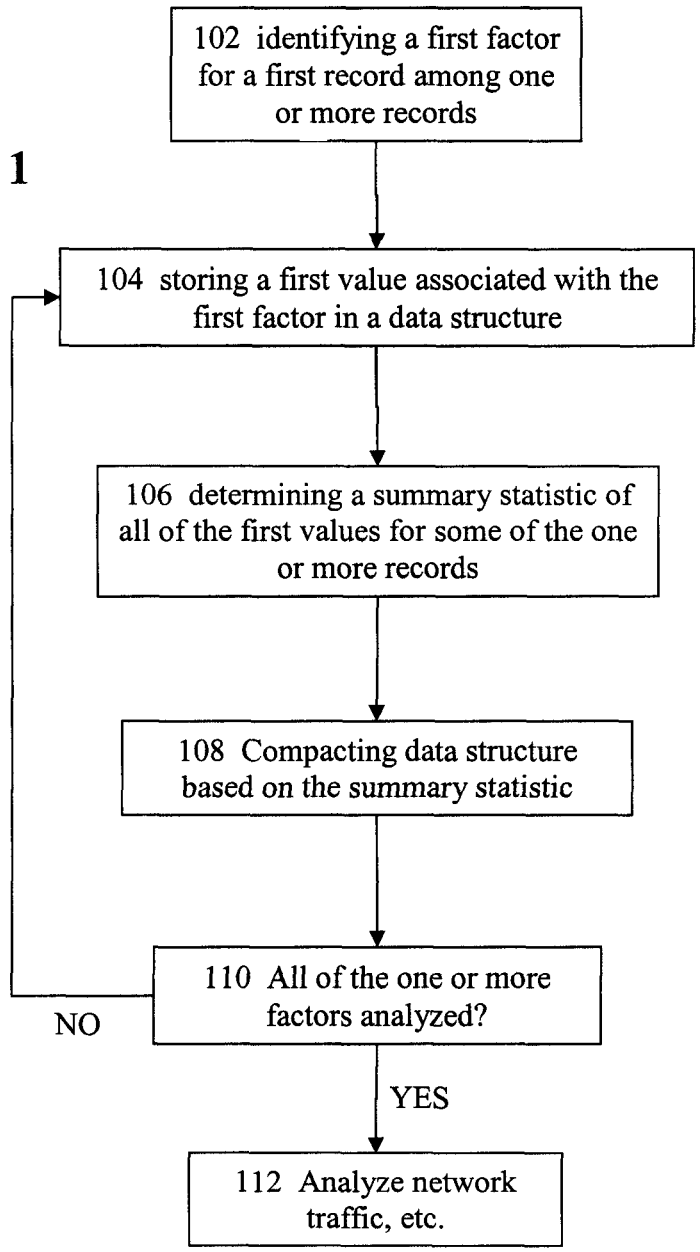
FIG. 1 illustrates a block diagram of the method or the system for determining a common factor with reduced resource utilization.

Referring to FIG. 1 which illustrates a block diagram of the method or the system for determining a common factor with reduced resource utilization in some embodiments of the present invention. At 102, the method or system of some embodiments of the invention first a first factor for a first record among one or more records. In one embodiment encompassing a computer network, the method or the system may determine the one or more factors by extracting one or more attributes from each of one or packets transmitted across the network.

It shall be noted that a record may constitute any information that can be obtained from the network that describes activities on the network. A record may simply comprise a single packet captured from the network. A record may also comprises information or data generated from network traffic monitoring technologies such as sFlow, NetFlow, IPFIX, and RMON. These network monitoring technologies examine the information transmitted across the network and summarize from the transmitted information to describe network activities. On the other hand, records may also be obtained from, for example, application logs such as web server access logs, voice over IP (VoIP) activity logs, firewall logs, etc. It shall also be noted that the definition of record should not be limited to these specific examples, but should be interpreted as any source of information describing network activities.

Thereafter, at 104, the method or system of some embodiments of the invention stores, in a data structure, a first value which is associated with the first factor. In one embodiment of the present invention, each record may have one or more factors which explain the network activities. In another embodiment, each factor may be associated with one or more values. The value may constitute, for example, a total amount of information or data transmitted such as the total bytes of information transmitted at or through a particular source or destination address. In yet another embodiment, the method or the system stores the first value into the data structure when the first value is determined to exceed certain threshold. Yet in another embodiment, the threshold may be defined to be the maximum amount of information allowed to be transmitted within a given period of time.

In one embodiment, the data structure may constitute an associative array such as a hash table or a binary tree. In another embodiment, the data structure may constitute a database. As to the first number, the first number may be defined to be a running total of the number of transmitted information of interest in one embodiment. In another embodiment, the first number may be defined to be the total number of transmitted information of interest. Yet in another embodiment, the first number may be defined to be the total number of data packets transmitted across a computer network. In yet another embodiment, the first number may be defined to the amount of data transmitted across the network.

Referring back to FIG. 1. Once the method or the system stores a first value associated with a first factor in a data structure, the method or the system of some embodiments of the invention determines a summary statistic for all of the first values for some of the one or more records at 106. In one embodiment, the method or the system may determine the summary statistic of all of the first values of all of the one or more records.

In one embodiment of the present invention, the method or the system determines an arithmetic mean of some or all of the first numbers for the one or more factors. In another embodiment of the present invention, the method or the system determines a weighted average of some or all of the first numbers for the one or more factors across the network. Yet in another embodiment of the present invention, the method or the system determines the median of some or all of the first numbers for the one or more factors. In yet another embodiment, the method or the system determines the median of some or all of the first number of transmitted information by sorting the data structure in a certain order to locate the median. While in yet another embodiment of the present invention, the method or the system randomly selects some of the first number of transmitted information in the structure to determine the summary statistic. Yet in another embodiment of the present invention where a hash table is used to store the first value, the method or the system samples the hash table by traversing a number of entries from the hash table. A hash table operates using a hash function that is computed over the fields which act as keys in the hash table to identify the record index in the hash table. It is noted that using a hash table or a database provides for efficient location and updating of records in the table or database without traversing the table or database. Furthermore, a good hash function will ensure that the order of records in the table is essentially random—thus the table may be sampled by traversing the first entries.

Once the summary statistic has been determined, the method or the system then compacts the data structure based upon the summary statistic at 108. In one embodiment of the present invention, the method or the system traverses the data structure freeing all entries which are associated with the first values smaller than or equal to the summary statistic. In another embodiment of the present invention, the method or the system may optionally add running totals associated with the freed entries to an accumulator so that the total number of freed entries is known.

At 110, some embodiments of the method or the system determine whether all of the one or more factors have been analyzed to further compact the data structure. Where the method or the system determines that all of the one or more factors have been analyzed such that all corresponding entries in the data structure are updated, the method or the system proceeds to 112 to perform further analyses on the network traffic based upon the compacted data structure. Where the method or the system determines that not all of the one or more factors have been analyzed, the method or the system goes back to 104 to process the next factor.

Figure 2:
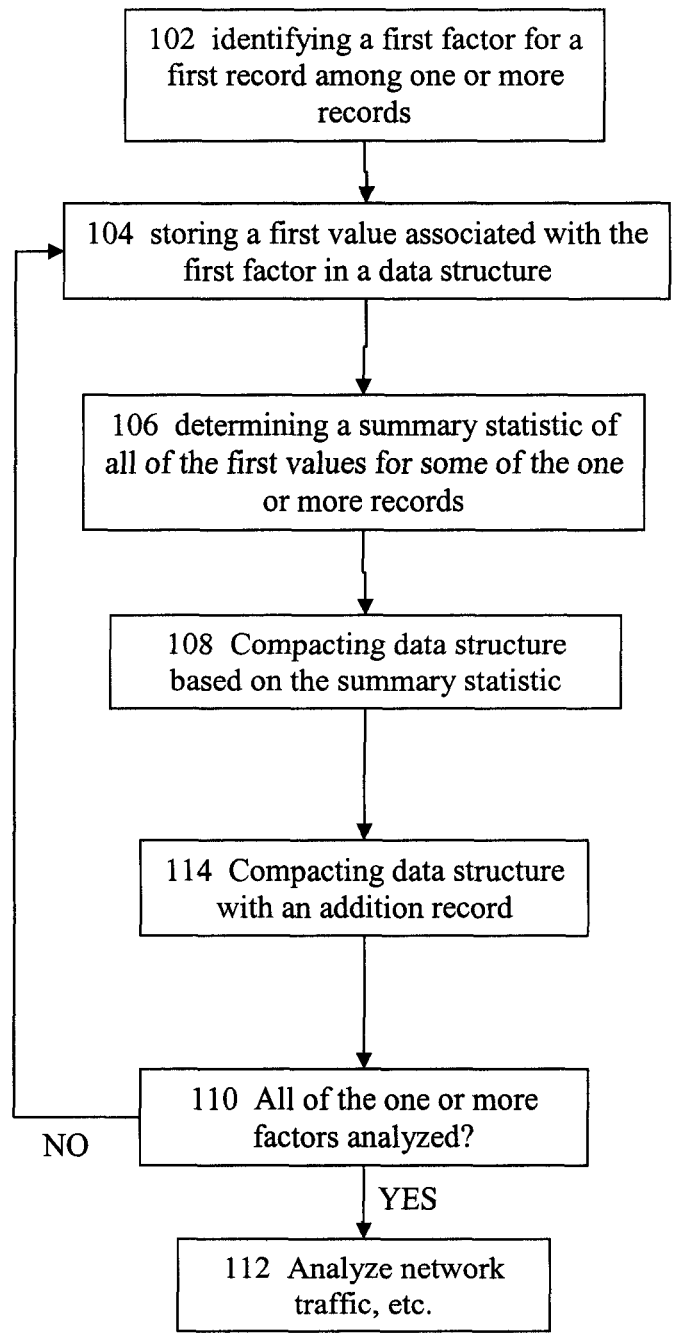
FIG. 2 illustrates the same method or system with an additional process for updating the data structure with additional transmitted information.

Referring to FIG. 2 which illustrates the same method or system 100 with an additional process, 114, which further compacts the data structure with additional records. In some embodiments, after the method or the system compacts the data structure in correspondence with the summary statistic, the method or the system may further update the data structure with one or more additional records until a first criterion is met. In one embodiment, the method or the system may continue to update the data structure with additional transmitted information until a time interval is complete. In another embodiment, the method or the system may continue to compact the data structure with a predetermined amount of additional records.

Yet in another embodiment, the method or the system limits the amount of additional records to be used in compacting the data structure such that the probability of misranking the compacted data structure is within a predetermined tolerance. In one embodiment, the method or the system places a limit, L, on the size of the hash table for the first values in which L is some multiple of the total number of factors identified. In another embodiment, L may be defined to be the lesser of the total number of transmitted information and a certain multiple of the number of factors identified. Yet in another embodiment, the method or the system may continue to update the data structure with additional transmitted information until the network resource utilization drops below a predetermined level.

Figure 3:
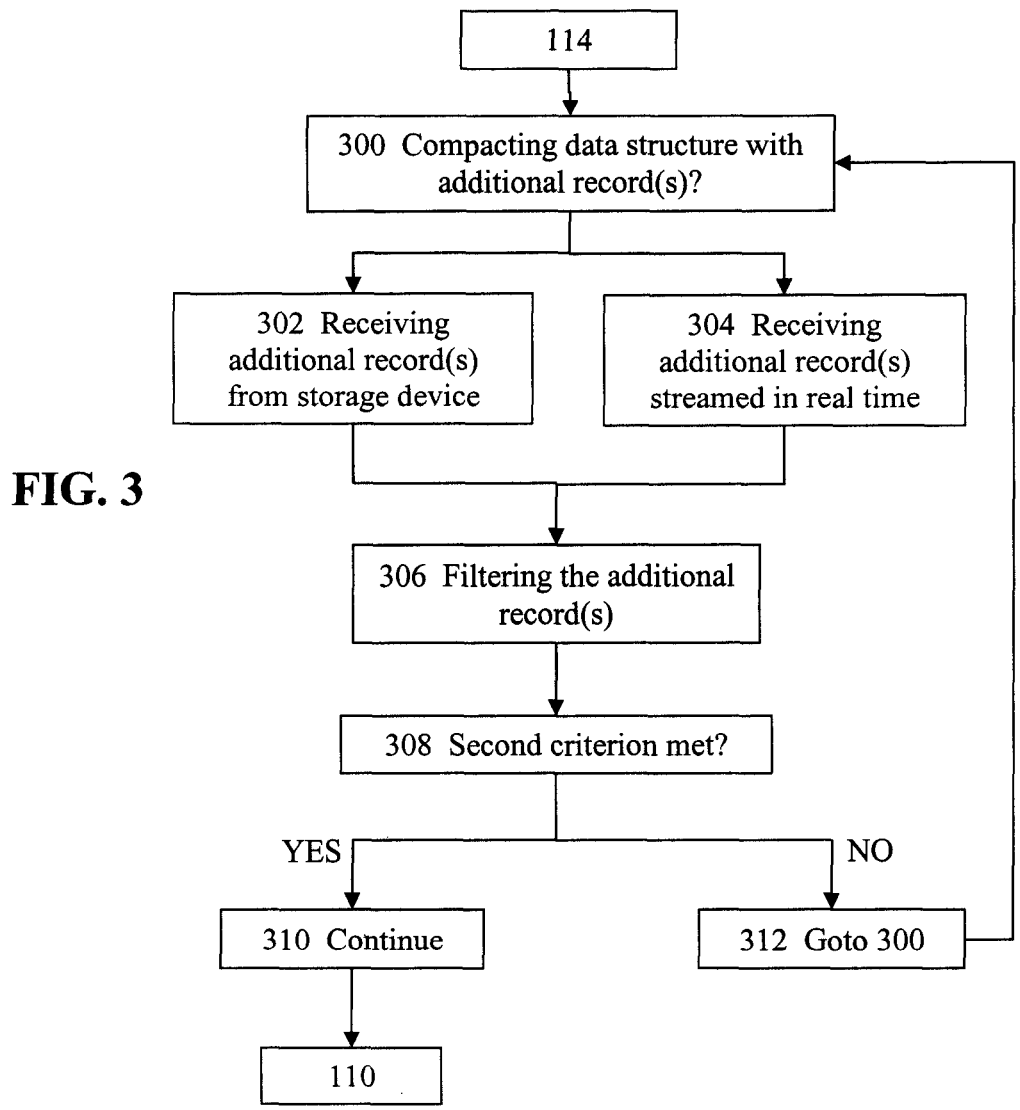
FIG. 3 illustrates further details of the action of updating the data structure with additional transmitted information.

Referring to FIG. 3 which illustrates further details of the action of compacting the data structure with one or more additional records at 114 in some embodiments of the present invention. The method or the system starts at 300 after the action at 114. The method or the system may receive the one or more additional records to compact the data structure from one or more storage devices at 302. In other embodiments, the method or the system may receive the one or more additional records which are being streamed in real time at 304. Yet in some other embodiments, the method or the system may receive the one or more additional records which are stored in one or more storage device or are being streamed in real time.

At 306, the method or the system may optionally filter the one or more additional records until a second criterion is met. In some embodiments of the present invention, the method or the system filters the additional transmitted information to reduce a total number of the additional transmitted information to be used to update the data structure to one or more predetermined amount. In other embodiments of the present invention, the method or the system may filter the one or more additional records to eliminate a part of each of the one or more additional records so only the pertinent part of each of the one or more additional records is left for further analysis.

At 308, the method or the system then determines whether a second criterion is met. In one embodiment, the method or the system may continue to compact the data structure with one or more additional records until a time interval is complete. In another embodiment, the time interval may be a predetermined measurement interval. In another embodiment, the method or the system may continue to compact the data structure with a predetermined amount of additional transmitted information. Yet in another embodiment, the method or the system may continue to compact the data structure with additional records until the network resource utilization drops below a predetermined level. Where the second criterion is determined to be met, the method or the system then terminates the compacting action with one or more additional records and proceeds to 110 at 310. On the other hand, where the second criterion is determined not to be met, the method or the system continues at 312 and goes back to 300 to receive more additional records to be used to compact the data structure.

Figure 4:
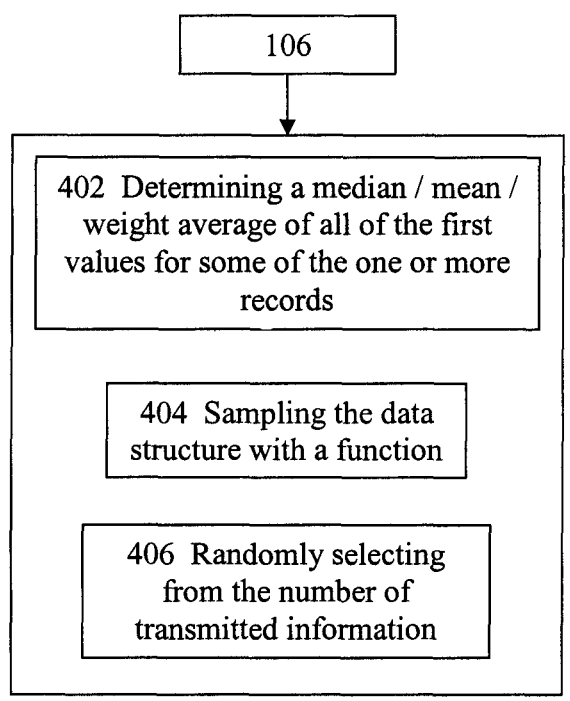
FIG. 4 illustrates more details of the action of determining a summary statistic for the first number of one or more transmitted information.

Referring to FIG. 4 which illustrates more details of the action of determining a summary statistic of all of the first values for some of the one or more records at 106 in some embodiments of the present invention. In one embodiment of the present invention, the method or the system first determines a median, an arithmetic mean, or some forms of weight average for all of the first values for some of the one or more records at 402. In one embodiment, the method or the system may first sort the data structure comprising the first values against the first values and then pick the median from the sorted first values. In another embodiment, the method or the system may compute the arithmetic mean for all the first values of all or some of the one or more records. Yet in another embodiment, the method or the system may assign different weights to first values associated with different factors and computes a weighted average for all of the first values.

In some other embodiments of the present invention, the method or the system randomly selects some of the first values of the one or more records in the data structure to determine the summary statistic at 406. In other embodiments of the present invention, the method or the system may also sample the data structure with a predefined function in 404. In some embodiments where a hash table is used to store the first number of transmitted information, the method or the system samples the hash table with a hash function. The hash function is computed over the fields which act as keys in the hash table to identify the record index in the hash table. It is noted that using a hash table or a database provides for efficient location and updating of records in the table or database without traversing the table or database.

Moreover, in some embodiments of the present invention, the method or the system determines the summary statistic for all of the values for only some of the one or more records. In some other embodiments of the present invention, the method or the system determines the summary statistic for all of the values for all of the one or more records. Furthermore, it shall be noted that in FIG. 4, various methods may be employed to determine the summary statistic.

Figure 5:
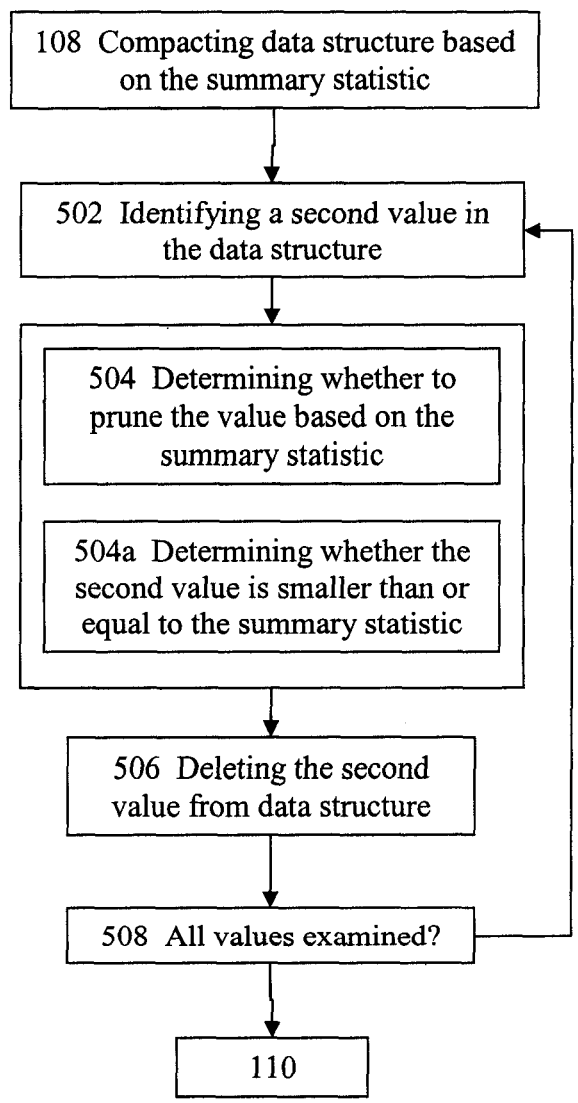
FIG. 5 depicts more details of the compacting the data structure action in some embodiments of the present invention.

Referring to FIG. 5 which illustrates more details of the compacting the data structure action 108 in some embodiments of the present invention. In some embodiments of the present invention, the method or the system first identifies a second value from the data structure at 502. In one embodiment, the method or the system identifies the second value by traversing the data structure. The method or the system may then determine whether to prune or to delete the second value from the data structure based upon the summary statistic at 504. In one embodiment of the present invention, the method or the system determines to delete or to prune the second value from the data structure where the second value is determined to be smaller than or equal to the summary statistic as shown in 504*a*. For example, where the summary statistic is determined to be 1 Mb within a given period, all the first values smaller than or equal to 1 Mb will be eliminated from the data structure as these first values may not be considered as significant contributors to excessive network activities.

At 506, the method or the system prunes the second value from the data structure based upon the summary statistic previously determined. At 508, the method or the system determines whether all of the second values in the data structure have been examined. Where all of the second values have been examined, the method or the system then continues to 110 in FIG. 1. Where the method or the system determines that not all of the second values of the data structure have been examined, the method or the system reverts back to 502 to identify the next second value and repeats the actions of 502-508 as described immediately above.

FIGS. 7A through 7K demonstrate an algorithm in accordance with an exemplary embodiment of the present invention. The implementation analyzes a stream of records containing the fields: source zone, source group, source address, destination zone, destination group, destination address, frames, bytes. The zones and groups represent a containment hierarchy for the addresses, that is, an address is contained within a group, which is in turn contained within a zone. Note that many containment hierarchies remain possible, based on information such as geographic locations, network subnets etc.

System Architecture Overview

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Figure 6:
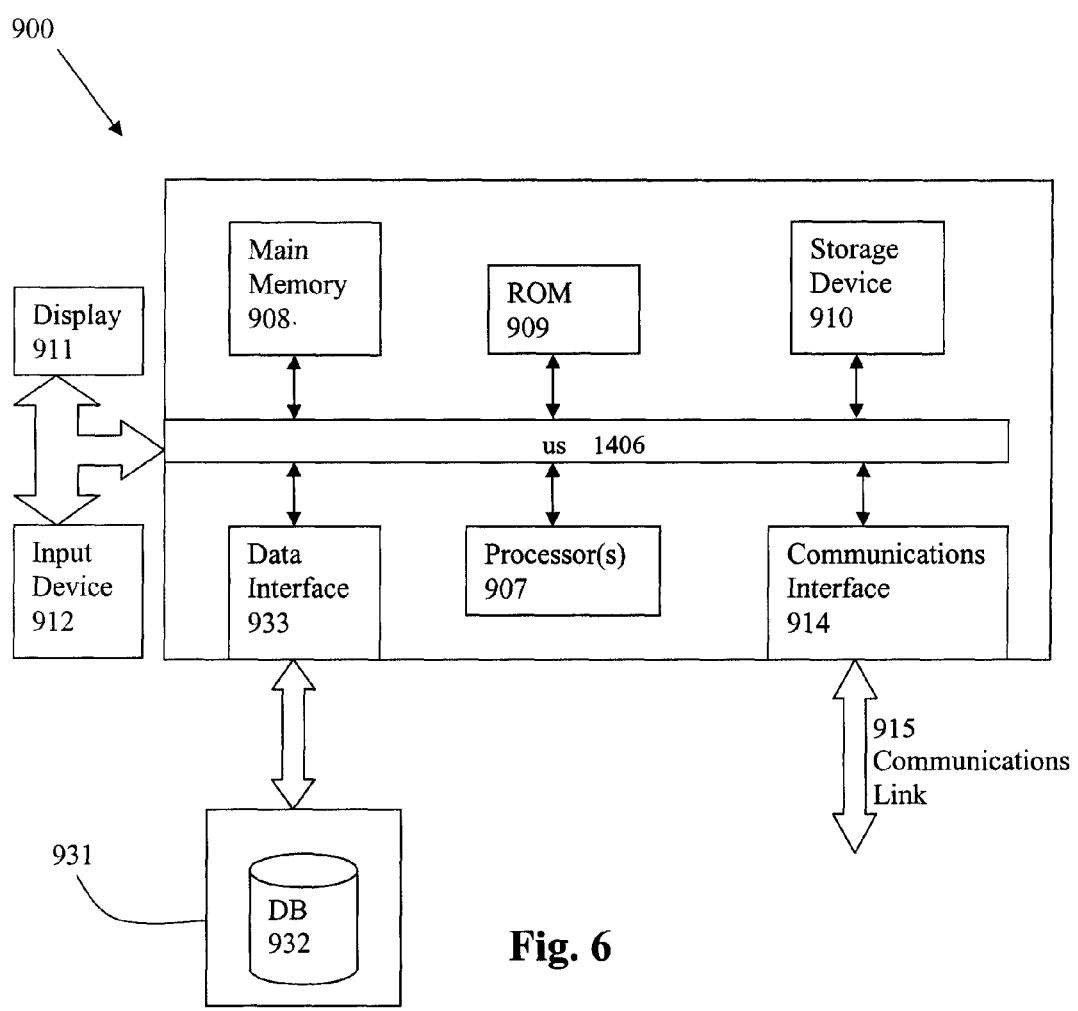
FIG. 6 depicts a computerized system on which a method for timing closure with concurrent process models can be implemented.

FIG. 6 is a block diagram of an illustrative computing system 900 suitable for implementing an embodiment of the present invention. Computer system 900 includes a bus 902 or other communication mechanism for communicating information, which interconnects subsystems and devices, such as processor 907, system memory 908 (e.g., RAM), static storage device 909 (e.g., ROM), disk drive 910 (e.g., magnetic or optical), communication interface 914 (e.g., modem or Ethernet card), display 911 (e.g., CRT or LCD), input device 912 (e.g., keyboard), and cursor control (e.g., mouse or trackball. Not shown.)

According to one embodiment of the invention, computer system 900 performs specific operations by processor 907 executing one or more sequences of one or more instructions contained in system memory 908. Such instructions may be read into system memory 908 from another computer readable/usable medium, such as static storage device 909 or disk drive 910. In alternative embodiments, hard-wired circuitry may be used in place of or in combination with software instructions to implement the invention.

The term "computer readable medium" or "computer usable medium" as used herein refers to any medium that participates in providing instructions to processor 907 for execution. Such a medium may take many forms, including but not limited to, non-volatile media, and volatile media. Non-volatile media includes, for example, optical or magnetic disks, such as disk drive 910. Volatile media includes dynamic memory, such as system memory 908.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 900. According to other embodiments of the invention, two or more computer systems 900 coupled by communication link 915 (e.g., LAN, PTSN, or wireless network) may perform the sequence of instructions required to practice the invention in coordination with one another.

Computer system 900 may transmit and receive messages, data, and instructions, including program, i.e., application code, through communication link 915 and communication interface 914. Received program code may be executed by processor 907 as it is received, and/or stored in disk drive 910, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for analyzing network traffic, the method comprising:
   identifying a first factor associated with each of a plurality of records by extracting attributes disposed in packets transmitted across the network, said packets comprising the plurality of records;
   storing a plurality of first values associated with the first factor in a data structure in a tangible medium accessible to the computer;
   determining a median of either the plurality of the first values or a subset of the plurality of the first values using a hash table; and
   pruning, using the computer, only the plurality of records whose plurality of first values are less than or equal to the median.

2. The computer implemented method of claim 1 further comprising:
   storing the plurality of first values in the hash table; and
   computing the median using data stored in first entries of the hash table.

3. The computer implemented method of claim 1, in which at least one of the plurality of records comprises a network usage record reflecting the network traffic, wherein the network usage record comprises a plurality of attributes.

4. The computer implemented method of claim 1, further comprising:
   identifying a second factor associated with the plurality of records.

5. The computer implemented method of claim 4, further comprising:
   storing in a non-transitory tangible medium a plurality of second values associated with a second factor identified in the plurality of records, said non-transitory tangible medium being accessible to the computer;
   determining a second median of either the plurality of the second values or a subset of the plurality of the second values using the computer; and
   pruning, using the computer, the plurality of records whose plurality of second values are less than or equal to the second median.

6. The computer implemented method of claim 5, wherein the pruning comprises pruning all the plurality of records whose plurality of second values are less than or equal to a threshold for excessive network activities.

7. The computer implemented method of claim 5, wherein a second value of the plurality of second values represents aggregated network activity.

8. The computer implemented method of claim 1, in which the first factor associated with at least one of the plurality of records is extracted from information transmitted across the network.

9. The computer implemented method of claim 1, in which the data structure is associated with a database or an associative array comprising a hash table or a binary tree.

10. The computer implemented method of claim 1, wherein at least one of the plurality of first values represents an amount of network traffic attributable to an associated first factor for an associated first record.

11. The computer implemented method of claim 1, wherein the pruning comprises pruning all the plurality of records whose plurality of first values are less than or equal to a threshold for excessive network activities.

12. The computer implemented method of claim 1, wherein a first value of the plurality of first values represents aggregated network activity.

13. A non-transitory computer readable storage medium comprising instructions that when executed by a processor disposed in the computer causes the processor to:
   identify a first factor associated with each of a plurality of records by extracting attributes disposed in packets transmitted across the network, said packets comprising the plurality of records;
   store a plurality of first values associated with the first factor in a data structure in a non-transitory tangible medium accessible to the computer;
   determine a median of either the plurality of the first values or of a subset of the plurality of the first values using a hash table; and
   prune only the plurality of records whose plurality of first values are less than or equal to the median.

14. The non-transitory computer readable storage medium of claim 13 wherein the non-transitory computer readable storage medium further comprises instructions that when executed by the processor causes the processor to:
   store the plurality of first values in the hash table; and
   compute the median using data stored in first entries of the hash table.

15. The non-transitory computer readable storage medium of claim 13, wherein the non-transitory computer readable storage medium further comprises instructions that when executed by the processor causes the processor to:
   identify a second factor associated with the plurality of records.

16. The non-transitory computer readable storage medium of claim 13, wherein the pruning comprises pruning all the plurality of records whose plurality of first values are less than or equal to a threshold for excessive network activities.

17. The non-transitory computer readable storage medium of claim 13, wherein the first value of the plurality of first values represents aggregated network activity.

* * * * *